United States Patent
Yamaguchi et al.

(10) Patent No.: US 9,933,032 B2
(45) Date of Patent: Apr. 3, 2018

(54) EDDY-CURRENT RETARDING DEVICE

(71) Applicant: NIPPON STEEL & SUMITOMO METAL CORPORATION, Tokyo (JP)

(72) Inventors: Hiroyuki Yamaguchi, Tokyo (JP); Kenji Imanishi, Tokyo (JP); Yasutaka Noguchi, Tokyo (JP); Takashi Futaba, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/408,671

(22) PCT Filed: Aug. 12, 2013

(86) PCT No.: PCT/JP2013/071799
§ 371 (c)(1),
(2) Date: Dec. 17, 2014

(87) PCT Pub. No.: WO2014/027640
PCT Pub. Date: Feb. 20, 2014

(65) Prior Publication Data
US 2015/0300432 A1  Oct. 22, 2015

(30) Foreign Application Priority Data

Aug. 13, 2012  (JP) .................................. 2012-179138

(51) Int. Cl.
*H02K 49/04* (2006.01)
*F16D 65/18* (2006.01)
(Continued)

(52) U.S. Cl.
CPC ................ *F16D 65/18* (2013.01); *B60L 7/06* (2013.01); *B60L 7/28* (2013.01); *F16D 55/22* (2013.01);
(Continued)

(58) Field of Classification Search
CPC .... H02K 49/043; H02K 49/046; H02K 49/04; H02K 49/108; H02K 49/10; F16D 67/06;
(Continued)

(56) References Cited

U.S. PATENT DOCUMENTS 3,553,507 A   1/1971   Bessiere
4,398,111 A   8/1983   Zuch
(Continued)

FOREIGN PATENT DOCUMENTS

CN   101322308   12/2008
CN   102270921   12/2011
(Continued)

OTHER PUBLICATIONS

Extended European Search Report for Application No. 13879586.9, dated Mar. 14, 2016.
(Continued)

*Primary Examiner* — Bradley T King
*Assistant Examiner* — Stephen M Bowes
(74) *Attorney, Agent, or Firm* — Clark & Brody

(57) ABSTRACT

This eddy-current retarding device includes: a magnet holding member that is coaxially provided to a rotating shaft and holds plural permanent magnets in a circumferential direction; a brake member that includes paired disk portions disposed on both sides of the magnet holding member in the axial direction of the rotating shaft, a connecting portion that connects the paired disk portions, and an eddy-current generating portion that causes eddy current due to rotation of the permanent magnets, and this brake member being supported in a relatively rotatable manner with respect to the rotating shaft; and a friction brake that causes a friction member to press against the brake member at the time of braking to bring the brake member to a stop.

11 Claims, 12 Drawing Sheets

(51) Int. Cl.

| | | |
|---|---|---|
| *B60L 7/06* | (2006.01) | |
| *F16D 55/22* | (2006.01) | |
| *F16D 63/00* | (2006.01) | |
| *H02K 49/10* | (2006.01) | |
| *B60L 7/28* | (2006.01) | |
| *F16D 55/225* | (2006.01) | |
| *F16D 65/84* | (2006.01) | |
| *F16D 66/00* | (2006.01) | |
| *F16D 65/853* | (2006.01) | |
| *F16D 121/18* | (2012.01) | |

(52) U.S. Cl.
CPC .......... *F16D 55/225* (2013.01); *F16D 63/00* (2013.01); *F16D 63/002* (2013.01); *F16D 65/84* (2013.01); *F16D 65/853* (2013.01); *F16D 66/00* (2013.01); *H02K 49/043* (2013.01); *H02K 49/046* (2013.01); *H02K 49/10* (2013.01); *B60L 2200/18* (2013.01); *B60L 2200/44* (2013.01); *F16D 2066/001* (2013.01); *F16D 2121/18* (2013.01); *Y02P 90/60* (2015.11); *Y02T 10/641* (2013.01)

(58) Field of Classification Search
CPC .... F16D 63/002; F16D 2121/20; F16F 15/03; F16F 15/035; B60T 13/741
USPC ................................. 310/76, 77, 92, 93, 105
IPC ................. F16D 67/00; H02K 49/04
See application file for complete search history.

(56) References Cited

U.S. PATENT DOCUMENTS

| | | | |
|---|---|---|---|
| 4,791,330 A | 12/1988 | Charbonnier et al. | |
| 5,121,018 A * | 6/1992 | Oldakowski | ............ F16D 55/02 |
| | | | 188/161 |
| 2007/0090908 A1* | 4/2007 | Kuwahara | ............ H02K 49/043 |
| | | | 335/306 |

FOREIGN PATENT DOCUMENTS

| | | | |
|---|---|---|---|
| DE | 720699 C | * | 5/1942 |
| DE | 1020242 B | * | 11/1957 |
| EP | 0469479 | | 2/1992 |
| EP | 2884130 | | 6/2015 |
| GB | 2484147 | | 4/2012 |
| JP | 61290242 A | * | 12/1986 |
| JP | 01234045 A | * | 9/1989 |
| JP | 01-298947 | | 12/1989 |
| JP | 01298947 A | * | 12/1989 |
| JP | 04-331456 | | 11/1992 |
| JP | 05038128 A | * | 2/1993 |
| JP | 05184129 A | * | 7/1993 |
| JP | 05-080178 | | 10/1993 |
| JP | 07-009085 | | 2/1995 |
| JP | 08-074894 | | 3/1996 |
| JP | 2001-292559 | | 10/2001 |
| JP | 2003-209965 | | 7/2003 |
| JP | 2011-097696 | | 5/2011 |
| JP | 2011-139574 | | 7/2011 |
| JP | 2011-182574 | | 9/2011 |
| WO | 2007/080280 | | 7/2007 |

OTHER PUBLICATIONS

Korean Office Action for Application No. 10-2015-7000955, dated Mar. 18, 2016.
European Office Action, Application No. 13879586.9 dated Apr. 5, 2017, and its English translation.
Chinese Office Action, Application No. 201380038230.0 dated Apr. 14, 2017, and its English translation.
Chinese Office Action dated Jul. 29, 2016, with its English translation.
Chinese Office Action, Application No. 201380038230.0 dated Jul. 29, 2016, with its English translation.

* cited by examiner

PRIOR ART

EDDY-CURRENT RETARDING DEVICE

TECHNICAL FIELD

The present invention relates to an eddy-current retarding device mounted as an auxiliary brake in transportation means including vehicles such as trucks and buses, and in particular, to an eddy-current retarding device using permanent magnets for generating braking force.

The present application claims priority based on Japanese Patent Application No. 2012-179138 filed in Japan on Aug. 13, 2012, the contents of which are incorporated herein by reference.

BACKGROUND ART

In general, an eddy-current retarding device (hereinafter, also simply referred to as a "retarding device") employing a permanent magnet (hereinafter, also simply referred to as a "magnet") includes a brake member fixed to a rotating shaft such as a propeller shaft, and at the time of braking, causes eddy current to be generated on the surface of the brake member opposite to the magnet, due to an effect of a magnetic field from the magnet. With this eddy current generated, braking force occurs in a direction opposite to the rotational direction of the brake member rotating integrally with the rotating shaft, thereby reducing the speed of the rotation shaft.

Retarding devices are roughly divided into a drum type and a disk type according to the shapes of a brake member that causes braking force by generating eddy current and the shapes of a magnet holding member that holds a magnet and is paired with the brake member, and there are various structures for switching from braking to non-braking and vice versa.

In recent years, in order to respond to requests for miniaturized devices, there have been proposed retarding devices that rotatably support, on a rotating shaft, a magnet holding member that holds the magnet, and brings the magnet holding member to a stop with a friction brake at the time of braking (see, for example, Patent Documents 1 to 5). Furthermore, there is proposed a retarding device in which, by replacing the brake member with the magnet holding member, the magnet holding member is fixed on the rotating shaft, and the brake member is rotatably supported on the rotating shaft, thereby stopping this brake member with the friction brake at the time of braking (see, for example, Patent Document 5). These retarding devices are called retarding devices with a synchronous rotation type, because the magnet holding member and the brake member synchronously rotate at the time of non-braking periods as described below.

FIG. 1 is a longitudinal sectional view showing a configuration example of a conventional retarding device with a synchronous rotation type. The retarding device shown in FIG. 1 is a disk-type retarding device, and includes a brake disk 101 serving as a brake member, and a magnet holding disk 104 that serves as a magnet holding member and holds a permanent magnet 105 so as to face the main surface of the brake disk 101.

In FIG. 1, the brake disk 101 is configured so as to rotate integrally with a rotating shaft 111 such as a propeller shaft. More specifically, a connecting shaft 112 is fixed with a bolt or other items so as to be coaxial with the rotating shaft 111, and a sleeve 113 with a flange is inserted into the connecting shaft 112 while being engaged using a spline, and is fixed with a nut 114. The brake disk 101 is fixed, for example, with a bolt to the flange of the sleeve 113 attached integrally with the rotating shaft 111, which makes it possible to rotate integrally with the rotating shaft 111.

The brake disk 101 is provided with radiating fins 102 on, for example, the outer circumference of the brake disk 101. These radiating fins 102 are formed integrally with the brake disk 101, and have a function of cooling the brake disk 101 itself. The brake disk 101 is formed with an electrically conductive material, which includes a ferromagnetic material such iron, a soft magnetic material such as ferritic stainless steel, and a non-magnetic material such as aluminum alloy and copper alloy.

In FIG. 1, the magnet holding disk 104 is configured so as to be able to rotate with respect to the rotating shaft 111. The magnet holding disk 104 may be integrally formed with a ring-shaped member 103 that is coaxial with the connecting shaft 112, or may be formed separately and be fixed to the ring-shaped member 103, for example, with a bolt. The ring-shaped member 103 is supported through bearings 115a and 115b by the sleeve 113 attached integrally with the rotating shaft 111. With this configuration, it is possible for the magnet holding disk 104 to rotate relatively to the rotating shaft 111. The bearings 115a and 115b are filled with lubricating grease. This lubricating grease is prevented from leaking by ring-shaped seal members 116a and 116b attached on both ends of the ring-shaped member 103 in the front and rear direction.

On a surface of the magnet holding disk 104 opposite to the main surface of the brake disk 101, plural permanent magnets 105 are fixed in the circumferential direction. Each of the permanent magnets 105 is oriented in a manner such that a direction of magnetic poles (north pole or south pole) is in an axial direction of the magnet holding disk 104, and the permanent magnets 105 are arranged in a manner such that magnetic poles of magnets adjacent in the circumferential direction are alternately different from each other.

In FIG. 1, to the magnet holding disk 104, a magnet cover 120 made out of a thin sheet is attached so as to cover the entire permanent magnets 105. This magnet cover 120 protects the permanent magnets 105 from iron powder or dust particles, and at the same time, provides a function of shielding radiant heat coming from the brake disk 101 to the permanent magnets 105, thereby suppressing a reduction in magnetic force of each of the permanent magnets 105 due to thermal effects. The magnet cover 120 is made out of a non-magnetic material so that the magnetic field does not suffer from any effect from the permanent magnets 105.

The retarding device shown in FIG. 1 includes a disk brake serving as a friction brake that stops the magnet holding disk 104 at the time of braking. This disk brake is disposed at the rear of the magnet holding disk 104, and is configured to include a brake disk 106 formed integrally with the ring-shaped member 103, a brake caliper 107 having brake pads 108a and 108b located at both sides of this brake disk 106, and an electrically driven direct-acting actuator 109 that drives this brake caliper 107. The brake disk 106 is attached to the ring-shaped member 103, for example, with a bolt, and is attached integrally with the ring-shaped member 103.

The brake caliper 107 has a pair of the brake pads 108a and 108b at the front and the rear therein. Between the brake pads 108a and 108b, the brake disk 106 is disposed to face each other with a predetermined gap therebetween, and the brake caliper 107 is pressed and supported toward the bracket 117, for example, with a bolt having a spring. This bracket 117 is attached to a non-rotating portion such as a chassis and a crossmember of a vehicle. Furthermore, the bracket 117 surrounds the ring-shaped member 103 at a position more rearward than the brake disk 106, and is supported by the ring-shaped member 103 through a bearing 118 in a rotatable manner. This bearing 118 is filled with lubricating grease. Leakage of this lubricating grease is prevented by ring-shaped seal members 119a and 119b attached on both ends of the bracket 117 in the front and rear direction.

The actuator 109 is fixed to the brake caliper 107, for example, with a bolt. The actuator 109 is actuated with an electrically driven motor 110, and converts rotary motion by the electrically driven motor 110 to linear motion, thereby linearly moving the brake pad 108b on the rear side toward the brake disk 106. With this movement, the brake pad 108b on the rear side presses the brake disk 106. With an effect of the resulting counterforce, the brake pad 108a on the front side moves toward the brake disk 106, so that the brake disk 106 is strongly squeezed by the brake pads 108a and 108b on the front and the rear sides.

In the retarding device shown in FIG. 1, the disk brake (friction brake) is not activated during non-braking periods. At this time, in the case where the brake disk 101 is made out of a ferromagnetic material or a soft magnetic material, as the brake disk 101 rotates integrally with the rotating shaft 111, the magnet holding disk 104 integrated with the ring-shaped member 103 rotates synchronously with the brake disk 101 due to a magnetic attraction effect between the permanent magnet 105 and the brake disk 101. With this configuration, there occurs no difference in relative rotational speed between the brake disk 101 and the permanent magnet 105, and hence, braking force does not occur.

In the case where the brake disk 101 is made out of a non-magnetic material, the magnetic attraction force does not act between the magnet 105 and the brake disk 101. However, in association with the brake disk 101 rotationally moving in a magnetic field from the magnet 105, braking force acts on the brake disk 101 due to the effect of the magnetic field. Thus, the magnet 105 receives the resulting counterforce, and rotates in the direction same as the brake disk 101. More specifically, the magnet 105 rotates at a relative rotational speed slightly differing from that of the brake disk 101 rotating in the same direction so as to maintain a balance between the braking force generated as a result of the difference in relative rotational speed between the brake disk 101 and the magnet 105, and a loss occurring at a bearing portion due to rotation of the magnet 105 or drag force related to air resistance caused by rotation of the magnet holding disk 104. In other words, in the case where the brake disk 101 is made out of a non-magnetic material, the magnet 105 does not rotate in a fully synchronized manner with the brake disk 101 but substantially synchronously rotates with a slight difference in rotational speed, whereby non-braking state is maintained.

On the other hand, at the time of braking, the disk brake (friction brake) is caused to activate to make the brake disk 106 squeezed by the brake pads 108a and 108b. With this operation, the magnet holding disk 104 formed integrally with the ring-shaped member 103 stops rotating, and the magnet holding disk 104 is brought to a stop. If only the magnetic holding disk 104 is brought to a stop when the brake disk 101 is rotating, a difference in relative rotational speed takes place between the brake disk 101 and the permanent magnet 105. This causes eddy current to be generated on the main surface of the brake disk 101 due to an effect of a magnetic field from the permanent magnet 105, whereby it is possible to cause the braking force to act on the rotating shaft 111 through the brake disk 101. Note that, during braking periods, the same principle, involving the effect of the magnetic field, applies regardless of whether the brake disk 101 is made out of a ferromagnetic material or non-magnetic material, and braking efficiency differs due to a difference in electrical conductivity or magnetic permeability between materials, which makes it possible to appropriately select materials for the brake disk 101 at the time of designing magnetic circuits.

As described above, the retarding device shown in FIG. 1 has a configuration in which the brake disk 101 serving as the brake member is connected to the rotating shaft 111, and the magnet holding disk 104 serving as the magnet holding member is rotatably supported on the rotating shaft 111. However, it may be possible to employ a configuration in which the brake disk 101 and the magnet holding disk 104 are interchanged with each other. More specifically, it may be possible to employ a configuration in which the magnet holding disk 104 is fixed to the rotating shaft 111, and the brake disk 101 is rotatably supported on the rotating shaft 111.

In the case of this retarding device, during non-braking periods, as the magnet holding disk 104 rotates integrally with the rotating shaft 111, the brake disk 101 integrated with the ring-shaped member 103 rotates in synchronization with the magnet holding disk 104 due to the magnetic attraction effect (in the case where the brake disk 101 is made out of a magnetic material) with the permanent magnet 105 held by the magnet holding disk 104, or the effect of a magnetic field (in the case where the brake disk 101 is made out of a non-magnetic material). For this reason, there occurs no difference in relative rotational speed between the brake disk 101 and the permanent magnet 105 of the magnet holding disk 104, and hence, the braking force does not occur.

On the other hand, at the time of braking, the ring-shaped member 103 stops rotating due to operation of the disk brake, and the brake disk 101 is brought to a stop. If only the brake disk 101 is brought to a stop when the magnet holding disk 104 is rotating, a difference in relative rotational speed takes place between the brake disk 101 and the permanent magnet 105 of the magnet holding disk 104. This causes eddy current to be generated on the main surface of the brake disk 101. Consequently, braking force in a direction opposite to the rotational direction of the magnet holding disk 104 rotating takes place in accordance with the Fleming's left-hand rule based on the interaction between the eddy current generated on the main surface of the brake disk 101 and magnetic flux density from the permanent magnet 105, whereby it is possible to reduce the speed of rotation of the rotating shaft 111 through the magnet holding disk 104.

Furthermore, in the description of the retarding device with a synchronous rotation type above, a disk type has been described. However, the same description applies to the case of a drum type.

RELATED ART DOCUMENTS

Patent Document

Patent Document 1: Japanese Unexamined Patent Application, First Publication No. H4-331456
Patent Document 2: Japanese Unexamined Utility Model Application, First Publication No. H5-80178
Patent Document 3: Japanese Unexamined Patent Application, First Publication No. 2011-97696
Patent Document 4: Japanese Unexamined Patent Application, First Publication No. 2011-139574

Patent Document 5: Japanese Unexamined Patent Application, First Publication No. 2011-182574

DISCLOSURE OF THE INVENTION

Problems to be Solved by the Invention

The conventional retarding device with a synchronous rotation type described above has the following problems.

First, the friction brake (disk brake) is indispensable in order to stop a member rotatably supported on the rotating shaft, which is either the brake member or the magnet holding member, at the time of braking, and in the case where the brake member and the brake disk are connected in series, the size of the retarding device increases in the axial direction.

Second, a strong magnetic flux flows at all times in a space between the brake member and the magnet of the magnet holding member. Hence, there is a possibility that ferromagnetic foreign substances such as iron powders enter the space between the brake member and the magnet holding member and attach therein, and these foreign substances accumulate and grow. If the foreign substances accumulate as described above, the brake member or the magnet (magnet cover in the case where the magnet cover is provided) rubs against the foreign substances in the case where a difference in relative rotational speed between the brake member and the magnet takes place at the time of braking, which possibly prevents the relative rotation between the brake member and the magnet or leads to a deterioration in performance of the brake member or the magnet.

The present invention has been made in view of the problems described above, and an object of the present invention is to provide an eddy-current retarding device with a synchronous rotation type having a reduced size by reducing the size of the device in the axial direction.

Means for Solving the Problem

In order to solve the problems described above and achieve the object described above, the present invention employs the following aspects.

(1) An eddy-current retarding device according to one aspect of the present invention includes: a magnet holding member that is coaxially provided to a rotating shaft and holds plural permanent magnets in a circumferential direction; a brake member including paired disk portions disposed on both sides of the magnet holding member in an axial direction of the rotating shaft, a connecting portion that connects the paired disk portions, and an eddy-current generating portion that causes eddy current due to rotation of the permanent magnets, this brake member being supported in a relatively rotatable manner with respect to the rotating shaft; and a friction brake that causes a friction member to press against the brake member at a time of braking to bring the brake member to a stop.

(2) In the aspect of (1) described above, the brake member may cover an area around the magnet holding member.

(3) In the aspect of (1) or (2) described above, it may be possible to employ a configuration in which the plural permanent magnets are arranged in a manner such that different magnetic poles are alternately arranged in a circumferential direction on a surface of the magnet holding member perpendicular to the rotating shaft, and are disposed so as to face the eddy-current generating portion formed on an inner surface of at least one of the paired disk portions.

(4) In the aspect of (3) described above, it may be possible to employ a configuration in which the plural permanent magnets are disposed in plural through-holes formed in a circumferential direction of the magnet holding member so as to penetrate the magnet holding member in an axial direction of the rotating shaft, and each of the poles faces the eddy-current generating portion formed on an inner surface of each of the paired disk portions.

(5) In the aspect of (1) or (2) described above, it may be possible to employ a configuration in which the connecting portion is a cylindrical member that connects the paired disk portions on an outer periphery, and has an inner peripheral surface having the eddy-current generating portion formed thereon, and the plural permanent magnets are arranged in a radial direction of the magnet holding member in a manner such that different magnetic poles are alternately arranged circumferentially on an outer periphery side of the magnet holding member, and face the eddy-current generating portion.

(6) In the aspect of (1) or (2) described above, it may be possible to employ a configuration in which the connecting portion is a cylinder portion that connects the paired disk portions on an outer periphery, and the eddy-current generating portion is formed on an inner surface of at least one of the paired disk portions and an inner peripheral surface of the cylinder portion; the plural permanent magnets are arranged on an outer periphery of the magnet holding member in a manner such that magnetic poles are alternately arranged in a circumferential direction; and a ferromagnetic member is disposed between the plural permanent magnets, and the ferromagnetic member faces the eddy-current generating portion.

(7) In the aspect of any one of (1) to (6) described above, an impeller disposed next to an external surface of each of the paired disk portions and connected to the rotating shaft may be further provided.

(8) In the aspect of any one of (1) to (7) described above, the friction brake may include a brake caliper that is fixed to a non-rotating portion of a vehicle provided with the rotating shaft, and has paired brake pads that serve as the friction member to squeeze the paired disk portions; and an actuator that actuates the brake caliper, and moves the paired brake pads toward the disk portions.

(9) In the aspect of (8) described above, there may be further provided: a temperature sensor that is brought into contact with an external surface of each of the disk portions in association with movement of the brake pads toward the disk portions, and detects a temperature of the disk portions; and an actuator controlling unit that stops actuating the actuator in the case where the temperature of the disk portions detected by the temperature sensor exceeds a predetermined temperature.

(10) In the aspect of (8) or (9) described above, a cooling member that is brought into contact with an external surface of each of the disk portions in association with movement of the brake pads toward the disk portions may be further provided.

(11) In the aspect of any one of (1) to (10) described above, the brake member may include a section facing the permanent magnets and having plural wire-wound coils embedded therein along a circumferential direction.

Effects of the Invention

According to the eddy-current retarding device of each of the aspects of the present invention, it is possible to reduce the size in the axial direction to achieve miniaturization.

Furthermore, as described in the aspect of (2), in the case where the magnet holding member is surrounded with the brake member, it is possible to prevent foreign substances from entering the space between the brake member and the permanent magnets, and furthermore, prevent the foreign substances from attaching to the space between the brake member and the permanent magnets.

EMBODIMENTS OF THE INVENTION

The present inventors carried out thorough investigation to achieve the object described above. As a result, the present inventors found that, in a retarding device with a synchronous rotation type employing permanent magnets, in order to reduce the size of the device in the axial direction, it is effective to configure a friction brake such that: a magnet holding member is connected to a rotating shaft; this magnet holding member is disposed so as to be located between brake members in the axial direction of the rotating shaft; these brake members are rotatably supported on the rotating shaft; and a friction member is pressed against each of the brake members at the time of braking to bring the brake members to a stop, and then, the present inventors completed the present invention.

Furthermore, it was found that, in order to prevent foreign substances from entering a space between each of the brake members and the permanent magnets, it is effective to employ a friction brake in which: a magnet holding member is fixed to a rotating shaft; brake members are configured so as to surround the entire magnet holding member; each of the brake members is rotatably supported on the rotating shaft; and a friction member is pressed against each of the brake members at the time of braking to bring the brake members to a stop, and then the present invention is completed.

Hereinbelow, each embodiment of an eddy-current retarding device according to the present invention will be described in detail.

First Embodiment

Below, with reference to FIG. 2A to FIG. 2C, a synchronous-rotation-type retarding device according to a first embodiment of the present invention will be described.

Figure 2A:
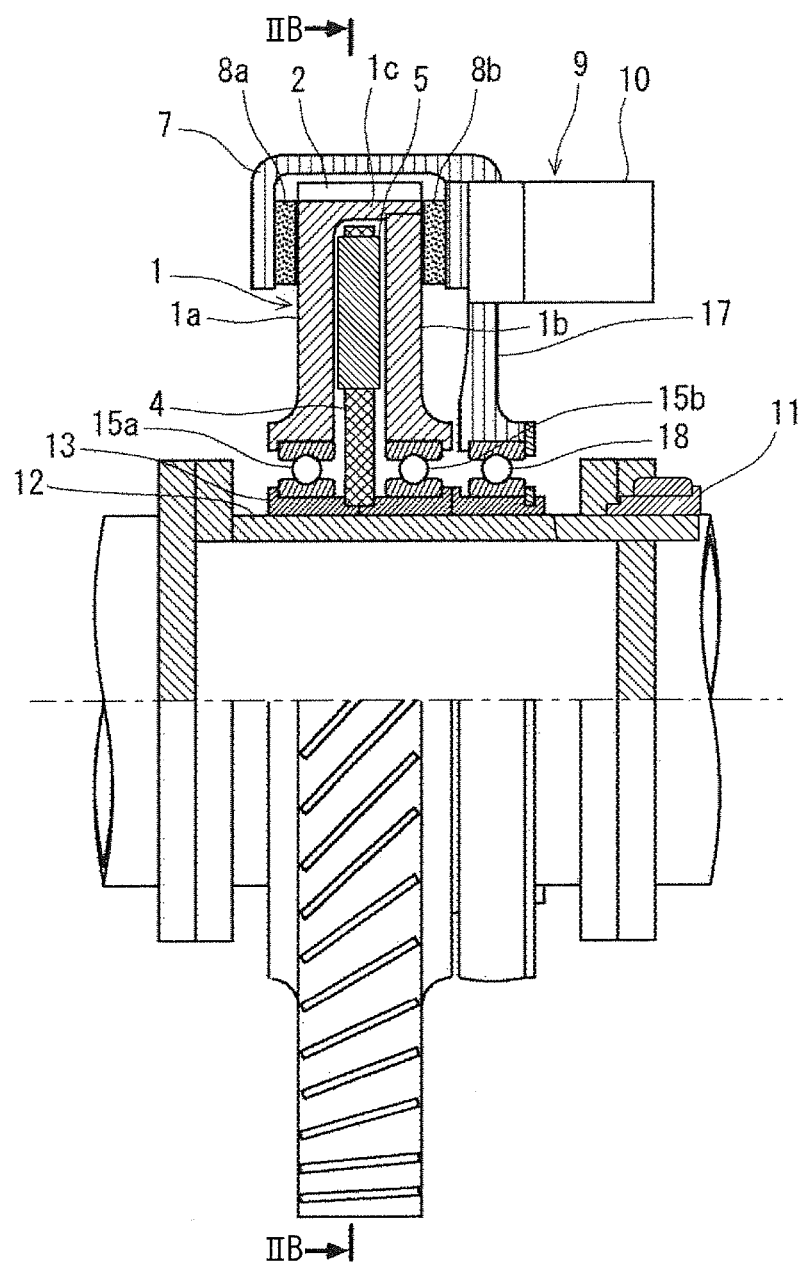
FIG. 2A is a schematic view showing the entire configuration of a retarding device with a synchronous rotation type according to a first embodiment of the present invention, and is a side view in which part of the device is sectionally shown.

FIG. 2A is a schematic view showing the entire configuration of the synchronous-rotation-type retarding device according to a first embodiment of the present invention, and a side view in which part of the device is sectionally shown. Furthermore, FIG. 2B is a diagram showing a cross section along IIB-IIB in FIG. 2A. Furthermore, FIG. 2C is a diagram showing a cross section along IIC-IIC in FIG. 2B.

The synchronous-rotation-type retarding device according to the first embodiment corresponds to a disk type, and includes a magnet holding member 4 that holds permanent magnets 5, and a brake member 1. The brake member 1 is configured so as to surround the entire magnet holding member 4 from the outside thereof.

In the first embodiment, the magnet holding member 4 has a disk-like shape whose both ends in the axial direction of a rotating shaft 11 are each provided with a surface perpendicular to the rotating shaft 11, and is configured such that the magnet holding member 4 is connected to the rotating shaft 11, and rotates integrally with the rotating shaft 11.

More specifically, a tubular connecting shaft 12 is coaxially fixed to the rotating shaft 11, for example, with a bolt, and the magnet holding member 4 is fixed to the connecting shaft 12 through a sleeve 13 press-fitted to this connecting shaft 12. With this configuration, the magnet holding member 4 rotates integrally with the rotating shaft 11.

Figure 2B:
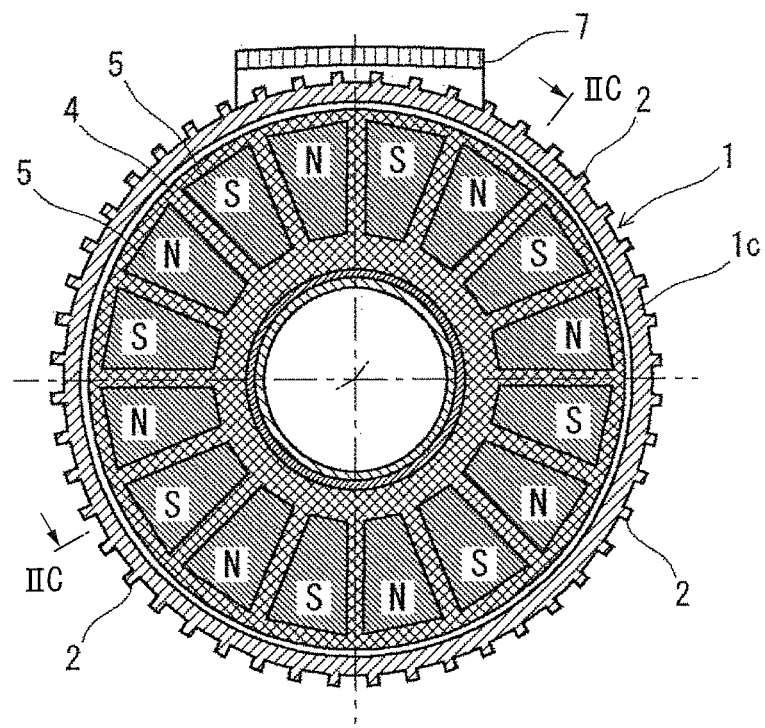
FIG. 2B is a diagram showing a schematic configuration of the retarding device with a synchronous rotation type according to the same embodiment, and is a diagram showing a cross section along IIB-IIB in FIG. 2A.
Figure 2C:
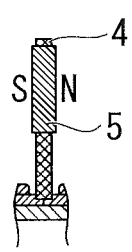
FIG. 2C is a diagram showing a schematic configuration of the retarding device with a synchronous rotation type according to the same embodiment, and is a diagram showing a cross section along IIC-IIC in FIG. 2B.
Figure 2C:
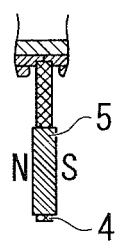

As shown in FIG. 2B and FIG. 2C, the magnet holding member 4 has windows (through holes) penetrated therethrough in the axial direction thereof and arranged at equal angular intervals in the circumferential direction, and each of the permanent magnets 5 is fitted into each of the windows in a manner that is fixed using an adhesive agent or metal fittings. As a result, the permanent magnets 5 are exposed from surfaces on both sides of the magnet holding member 4 in the axial direction of the rotating shaft 11, and face inner surfaces of both paired disk portions 1a and 1b (which will be described later).

The permanent magnets 5 are arranged in a manner such that each magnetic pole (north pole, south pole) of the permanent magnets 5 is directed to the axial direction of the rotating shaft 11, in other words, is directed so as to be parallel to the axial direction of the magnet holding member 4. Furthermore, the permanent magnets 5 are arranged in a manner such that magnetic poles of the permanent magnets 5 alternately intersect the circumferential direction when viewed on a surface of the magnet holding member 4 perpendicular to the rotating shaft 11.

As for a material of the magnet holding member 4, in the case of a configuration in which each of the permanent magnets 5 is fitted into each of the windows penetrated through in the axial direction, it is desirable to use a non-magnetic material such as aluminum and austenitic stainless, at least, around the windows in the vicinity of each of the permanent magnets 5. Note that it may be possible to use a non-magnetic material or a ferromagnetic material such as carbon steel for a portion connected with the rotating shaft 11.

The brake member 1 includes paired disk portions 1a and 1b having a doughnut shape, and a cylinder portion (connecting portion) 1c that connects these disk portions 1a and 1b on the outer periphery thereof, and is configured so as to be able to rotate with respect to the rotating shaft 11 while surrounding the magnet holding member 4. Furthermore, the brake member 1 has the disk portions 1a and 1b whose inner surfaces face both surfaces of the magnet holding member 4, and the cylinder portion 1c whose inner peripheral surface faces the outer peripheral surface of the magnet holding member 4. In the first embodiment, the inner surfaces of the paired disk portions 1a and 1b form an eddy-current generating portion.

Each of the disk portions 1a and 1b is supported through bearings 15a and 15b with the sleeve 13 that is integrated with the rotating shaft 11. With this configuration, the brake member 1 having the paired disk portions 1a and 1b and the cylinder portion 1c can freely rotate in an integrated manner with respect to the rotating shaft 11. FIG. 2A shows a mode in which the disk portion 1a on the front side and the cylinder portion 1c are integrally formed, and these are integrated with the disk portion 1b on the rear side using, for example, a bolt.

The brake member 1, in particular, the inner surfaces of the disk portions 1a and 1b form the eddy-current generating portion. Hence, it is preferable for the disk portions 1a and 1b to be made out of an electrically conductive material, and in particular, be made out of a ferromagnetic material such as carbon steel and cast iron, a soft magnetic material such as ferritic stainless steel, or a non-magnetic material such as aluminum alloy and copper alloy. Furthermore, in order to further improve braking efficiency by using the materials described above as a base material of the brake member, it is more preferable that the surface layer portion of the inner surface of each of the disk portions 1a and 1b facing the permanent magnets 5 is made out of a highly electrically conductive material such as copper and copper alloy.

The brake member 1 has an outer periphery provided with plural radiating fins 2 formed integrally with the cylinder portion 1c. Note that, in the disk portions 1a and 1b of the brake member 1, these radiating fins 2 may be provided in any area that does not interfere with formation of a friction member of a friction brake, which will be described later, for example, in an area of an inner periphery portion of an external surface. These radiating fins 2 function of cooling the brake member 1 itself.

The retarding device shown in FIG. 2A includes a friction brake that brings the brake member 1 to a stop at the time of braking. This friction brake includes: a brake caliper 7 that has brake pads 8a and 8b serving as friction members that squeeze the outer periphery portion of the brake member 1, in other words, the outer periphery portion of the external surface of each of the disk portions 1a and 1b from both sides in the axial direction; and an electrically driven direct-acting actuator 9 that drives this brake caliper 7.

The brake caliper 7 has the brake pads 8a and 8b paired at the front and the rear, and is pressed and supported toward a bracket 17, for example, with a bolt provided with a spring, in a state where the brake member 1 is disposed between the brake pads 8a and 8b with a predetermined gap. This bracket 17 is attached to a non-rotating portion of the vehicle.

Furthermore, the bracket 17 is rotatably supported, through a bearing 18, with the sleeve 13 integrated with the rotating shaft 11. However, in the case of a retarding device mounted on the output side of a transmission of the vehicle, it is not necessary for the bracket 17 to be supported through the bearing 18 if the bracket 17 is fixed to a transmission cover (non-rotating portion). This is because the transmission cover is supported through the bearing.

An actuator 9 is fixed to the brake caliper 7, for example, with a bolt. The actuator 9 is actuated, for example, with an electrically driven motor 10, and converts rotary motion by the electrically driven motor 10 to linear motion, thereby linearly moving the brake pad 8b on the rear side toward the disk portion 1b on the rear side. With this movement, the brake pad 8b on the rear side presses the disk portion 1b on the rear side. Furthermore, with an effect of the resulting counterforce, the brake pad 8a on the front side moves toward the disk portion 1a on the front side, so that the brake member 1 is strongly squeezed by the brake pads 8a and 8b on the front and the rear sides.

With the retarding device according to the first embodiment as described above, the friction brake is not activated during non-braking periods. At this time, as the magnet holding member 4 rotates integrally with the rotating shaft 11, the paired disk portions 1a and 1b, which constitute the brake member 1, rotate synchronously with the magnet holding member 4 due to a magnetic attraction effect of the permanent magnets 5 held by the magnet holding member 4 (in the case where the brake member 1 is made out of a magnetic material) or an effect of a magnetic field (in the case where the brake member 1 is made out of a non-magnetic material). With this configuration, there occurs no difference in relative rotational speed between the disk portions 1a and 1b (brake member 1) and the permanent magnets 5 of the magnet holding member 4, and hence, braking force does not occur.

On the other hand, if the friction brake is activated at the time of braking, the brake member 1 is squeezed by the brake pads 8a and 8b serving as the friction members. With this operation, the brake member 1 stops rotating, and the brake member 1 is brought to a stop. If the brake member 1 is brought to a stop when the magnet holding member 4 is rotating, a difference in relative rotational speed takes place between the disk portions 1a and 1b (brake member 1) and the permanent magnets 5 of the magnet holding member 4. This causes eddy current to be generated on the inner surface of each of the disk portions 1a and 1b. With the generation of eddy current on the inner surface of each of the disk portions 1a and 1b, braking force in a direction opposite to the rotational direction of the magnet holding member 4 rotating takes place in accordance with the Fleming's left-hand rule based on the interaction between the eddy current generated on the inner surface of each of the disk portions 1a and 1b of the brake member 1 and magnetic flux density from the permanent magnets 5, whereby it is possible to reduce the speed of rotation of the rotating shaft 11 through the magnet holding member 4.

Figure 1:
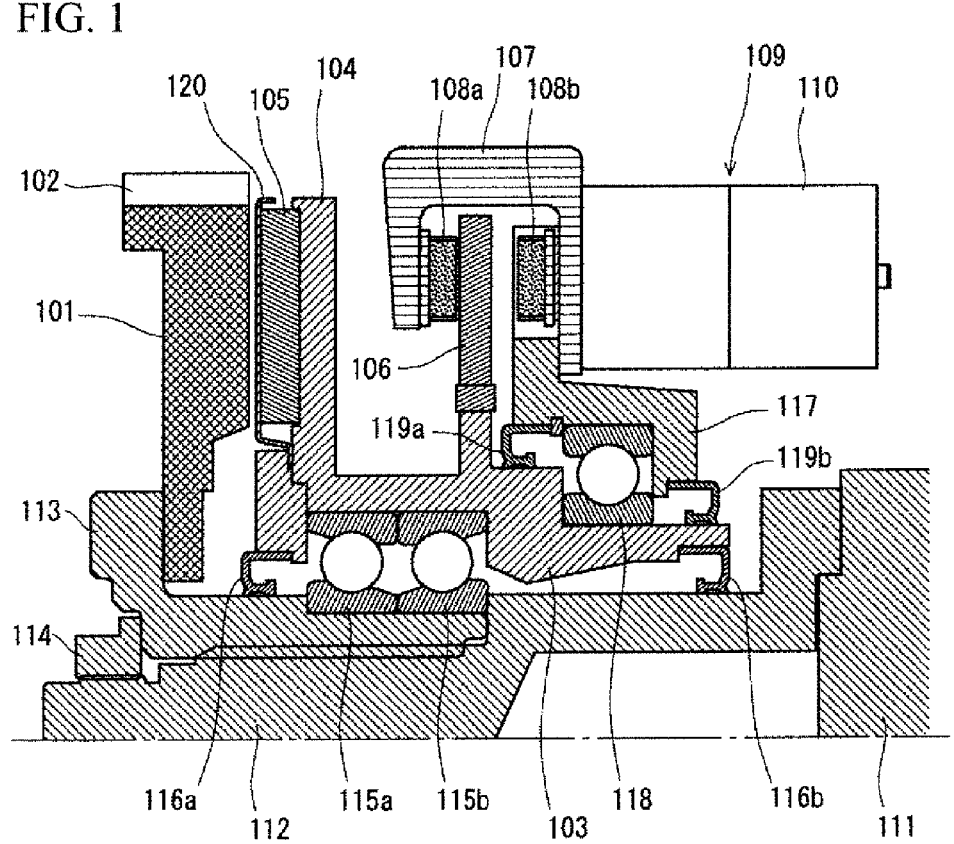
FIG. 1 is a longitudinal sectional view showing an example of a configuration of a conventional synchronous-rotation-type retarding device.

According to the retarding device of the first embodiment, the separately independent brake disk 106, which is necessary in the conventional retarding device shown in FIG. 1, is not necessary, and the friction brake that brings the brake member 1 to a stop by pressing the friction member directly against the brake member 1 at the time of braking is employed, whereby it is possible to reduce the size of the device in the axial direction. Moreover, since the entire brake member 1 is surrounded by the magnet holding member 4, the space between the disk portions 1a and 1b of the brake member 1 and the permanent magnets 5 is isolated from the outside. Thus, it is possible to prevent foreign substances from entering the space between the disk portions 1a and 1b of the brake member 1 and the permanent magnets 5 from the outside, and furthermore, it is possible to prevent the foreign substances from being attached in this space. This makes it possible to prevent the deterioration in the performance of the brake member 1 and the permanent magnets 5 due to the attachment of the foreign substances, and furthermore, to secure smooth relative rotation between the brake member 1 and the permanent magnets 5.

Furthermore, in the first embodiment, the eddy current takes place on the inner surface of each of the disk portions 1a and 1b of the brake member 1, and the braking force acts from two surfaces, whereby it is possible to significantly improve the braking efficiency. Additionally, since the magnet cover 120, which is necessary in the conventional retarding device shown in FIG. 1, is not necessary, it is possible to further improve the braking efficiency by narrowing the space between the disk portions 1a and 1b of the brake member 1 and the permanent magnets 5.

Second Embodiment

Below, with reference to FIG. 3A to FIG. 3D, a synchronous-rotation-type retarding device according to the second embodiment of the present invention will be described.

Figure 3A:
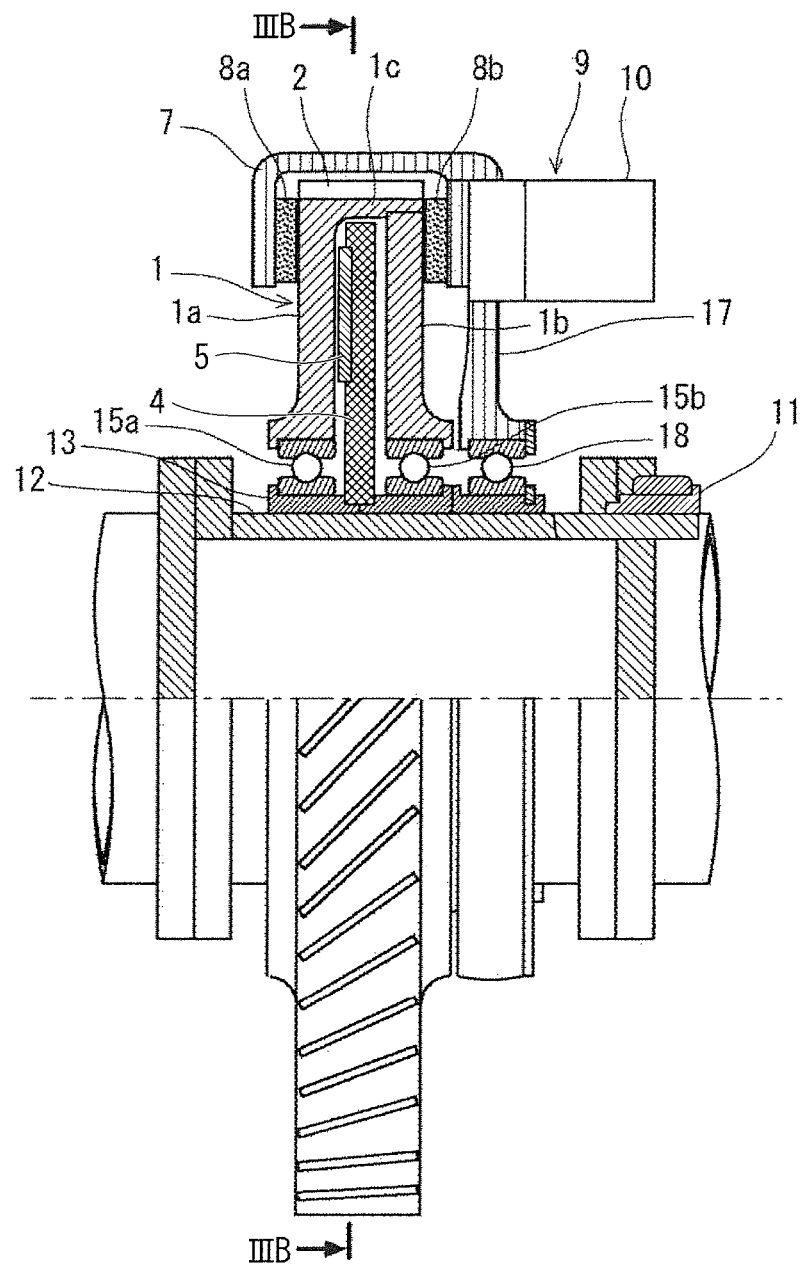
FIG. 3A is a schematic view showing the entire configuration of a synchronous-rotation-type retarding device according to a second embodiment of the present invention, and is a side view in which part of the device is sectionally shown.
Figure 3B:
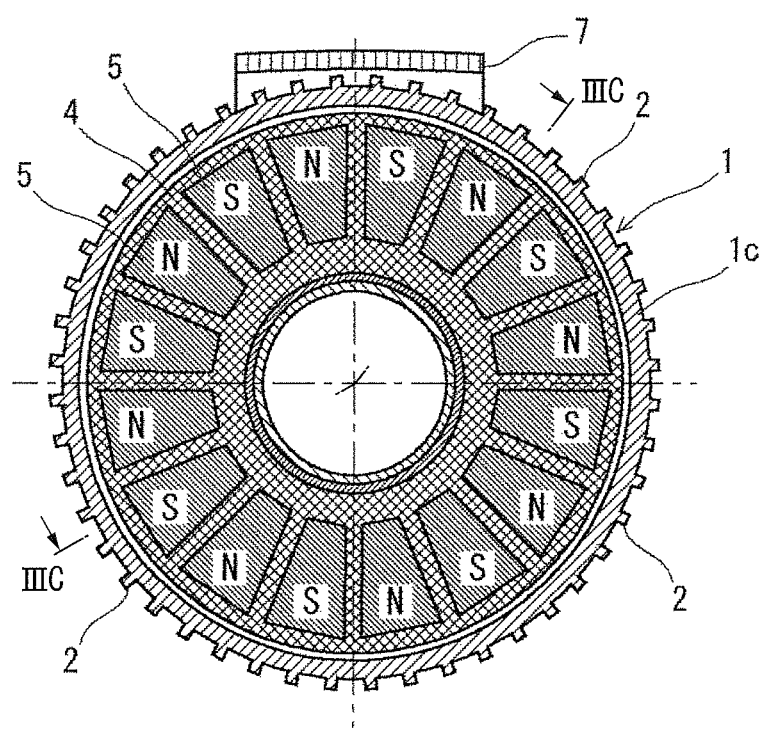
FIG. 3B is a diagram showing a schematic configuration of the synchronous-rotation-type retarding device according to the same embodiment, and is a diagram showing a cross section along IIIB-IIIB in FIG. 3A.
Figure 3C:
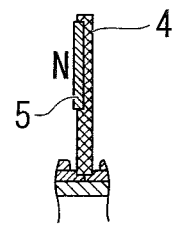
FIG. 3C is a diagram showing a schematic configuration of the synchronous-rotation-type retarding device according to, the same embodiment, and is a diagram showing a cross section along IIIC-IIIC in FIG. 3B.
Figure 3C:
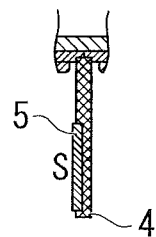
Figure 3D:
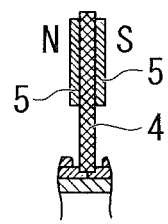
FIG. 3D is a diagram showing a schematic configuration of a modification example of the synchronous-rotation-type retarding device according to the same embodiment, and is a diagram showing a cross section similar to that in the case of FIG. 3C.
Figure 3D:
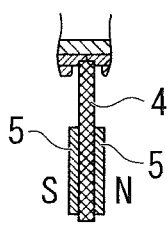

FIG. 3A is a schematic view showing the entire configuration of the synchronous-rotation-type retarding device according to the second embodiment of the present invention, and is a side view in which part of the device is sectionally shown. Furthermore, FIG. 3B is a diagram showing a cross section along IIIB-IIIB in FIG. 3A, and FIG. 3C is a diagram showing a cross section along IIIC-IIIC in FIG. 3B. Furthermore, FIG. 3D is a diagram showing a schematic configuration of a modification example of the synchronous-rotation-type retarding device according to the second embodiment, and is a diagram showing a cross section similar to that in the case of FIG. 3C.

The second embodiment shown in FIG. 3A to FIG. 3C is based on the configuration of the retarding device according to the first embodiment, and is different from the first embodiment in the following points.

The magnet holding member 4 has a surface perpendicular to the axial direction of the rotating shaft 11, and is configured to hold plural permanent magnets 5 at equal intervals in the circumferential direction of the magnet holding member 4. The permanent magnets 5 are arranged in a manner such that each magnetic pole (north pole, south pole) of the permanent magnets 5 is directed to the axial direction of the rotating shaft 11, in other words, to the axial direction of the magnet holding member 4. The plural permanent magnets 5 are arranged on a surface of the magnet holding member 4 facing the inner surface of the disk portion 1a at equal intervals in the circumferential direction in a manner such that different magnetic poles are alternately arranged (see FIG. 3B and FIG. 3C).

In the second embodiment, the magnet holding member 4 is not provided with any window as described in the first embodiment, and the permanent magnets 5 are disposed on a surface on one side of the magnet holding member 4. In this case, it is desirable to efficiently configure a magnetic circuit by using a ferromagnetic material such as carbon steel, ferritic stainless, and cast iron for a portion of the magnet holding member 4 to which each of the permanent magnets 5 is fixed. However, for a portion of the magnetic holding member 4 to be connected with the rotating member 11, a ferromagnetic material may be used or a non-magnetic material such as aluminum may be used.

In the second embodiment, an electrically conductive material is used as a material of the brake member 1, in particular, of the disk portion 1a. Others are similar to those in first embodiment. Hence, the same reference characters are attached, and explanations thereof will be not be repeated here.

With this retarding device according to the second embodiment, operations and effects similar to those in the first embodiment described above can be obtained.

Furthermore, in the second embodiment, the permanent magnets 5 are disposed only on the surface of one side of the magnet holding member 4, and configuration is made such that eddy current is generated on an eddy-current generating portion formed on the inner side of the disk portion 1a of the brake member 1. Thus, although the braking force is smaller than that obtained from the retarding device according to the first embodiment, the size of the rotating shaft 11 in the axial direction can be reduced.

Next, with reference to FIG. 3D, a modification example according to the second embodiment will be described.

FIG. 3D is a diagram showing a modification example according to the second embodiment, which has a configuration in which permanent magnets 5 are arranged on both surfaces of the magnet holding member 4 that does not have any window formed thereon. In such a case, it is desirable to efficiently configure a magnetic circuit by using a ferromagnetic material such as carbon steel, ferritic stainless, and cast iron for a portion of the magnet holding member 4 to which each of the permanent magnets 5 is fixed. However, for a portion of the magnetic holding member 4 to be connected with the rotating shaft 11, a ferromagnetic material may be used or a non-magnetic material such as aluminum may be used.

In the modification example of the second embodiment having the configuration as described above, independent permanent magnets 5 are each disposed on both surfaces of the magnet holding member 4, and hence, it is possible to improve the degree of freedom in arrangement on both sides of the magnet holding member 4. Furthermore, on both sides of the magnet holding member 4, each of the permanent magnets 5 causes eddy current to be generated on the paired disk portions 1a and 1b, and hence, it is possible to generate a large braking force.

Third Embodiment

Figure 4:
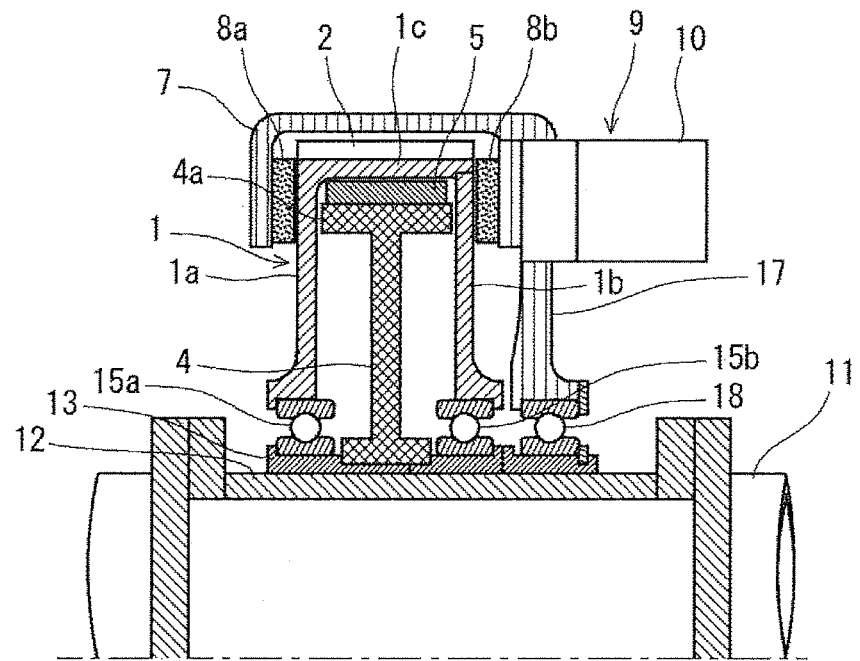
FIG. 4 is a schematic view showing the entire configuration of a synchronous-rotation-type retarding device according to a third embodiment of the present invention.

FIG. 4 is a schematic view showing the entire configuration of a retarding device with a synchronous rotation type, which is a third embodiment according to the present invention, and is a side view in which part of the device is schematically shown. The retarding device according to the third embodiment shown in FIG. 4 is based on the configuration of the retarding device according to the first embodiment, and is different from the first embodiment described above in the following points.

The retarding device according to the third embodiment corresponds to a drum type, and has the cylinder portion 1c of the brake member 1 formed longer in the axial direction thereof than that in the first embodiment. The magnet holding member 4 includes a magnet holding ring 4a formed on the outer periphery thereof so as to be coaxial with the cylinder portion 1c of the brake member 1, and a plurality of permanent magnets 5 are arranged on the outer peripheral surface of and in the circumferential direction of the magnet holding ring 4a. The permanent magnets 5 are arranged in a manner such that each magnetic pole (north pole, south pole) is directed in the radial direction of the magnet holding member 4. Furthermore, the permanent magnets 5 face the inner peripheral surface of the cylinder portion 1c of the brake member 1, and different magnetic poles thereof are alternately arranged circumferentially on the outer periphery side.

The material of the magnet holding ring 4a is a ferromagnetic material or a soft magnetic material as is the case with the magnet holding member 4. In the case of the third embodiment, it is more preferable that, for the cylinder portion 1c of the brake member 1, the surface layer portion of the inner peripheral surface (eddy-current generating portion) that faces the permanent magnets 5 are made out of a highly electrically conductive material such as copper and copper alloy.

With the retarding device according to the third embodiment having the configuration as described above, during non-braking periods, the rotating shaft 11 rotates integrally with the magnet holding member 4, and the brake member 1 rotates synchronously with the magnet holding member 4 due to the magnetic attraction effect of the cylinder portion 1c and the permanent magnets 5 held by the magnet holding member 4 (magnet holding ring 4a). Thus, there occurs no difference in relative rotational speed between the cylinder portion 1c (brake member 1) and the permanent magnets 5 of the magnet holding ring 4a, and hence, braking force does not occur.

On the other hand, if the friction brake is activated at the time of braking to bring the brake member 1 to a stop, the magnet holding member 4 keeps rotating, and hence, there occurs a difference in relative rotational speed between the cylinder portion 1c (brake member 1) and the permanent magnets 5 arranged on the magnetic holding member 4. This causes eddy current to be generated on the inner peripheral surface of the cylinder portion 1c. Then, braking force in a direction opposite to the rotational direction of the magnet holding member 4 rotating takes place due to the interaction between the eddy current generated on the inner peripheral surface of the cylinder portion 1c of the brake member 1 and magnetic flux density from the permanent magnets 5, whereby it is possible to reduce the speed of rotation of the rotating shaft 11 through the magnet holding member 4.

Therefore, with the retarding device according to the third embodiment, it is possible to obtain a similar effect to that obtained in the first embodiment.

Furthermore, in the third embodiment, eddy current occurs on the inner peripheral surface of the cylinder portion 1c, which is distant from the rotational center from among the disk portions 1a and 1b and the cylinder portion 1c, each of which constitutes the brake member 1. Thus, large braking torque can be obtained, and it is possible to significantly improve braking efficiency. Furthermore, the magnet cover 120, which is provided in the conventional retarding device shown in FIG. 1, is not necessary. Thus, by narrowing the space between the cylinder portion 1c of the brake member 1 and the permanent magnets 5, it is possible to further improve the braking efficiency.

Fourth Embodiment

Figure 5A:
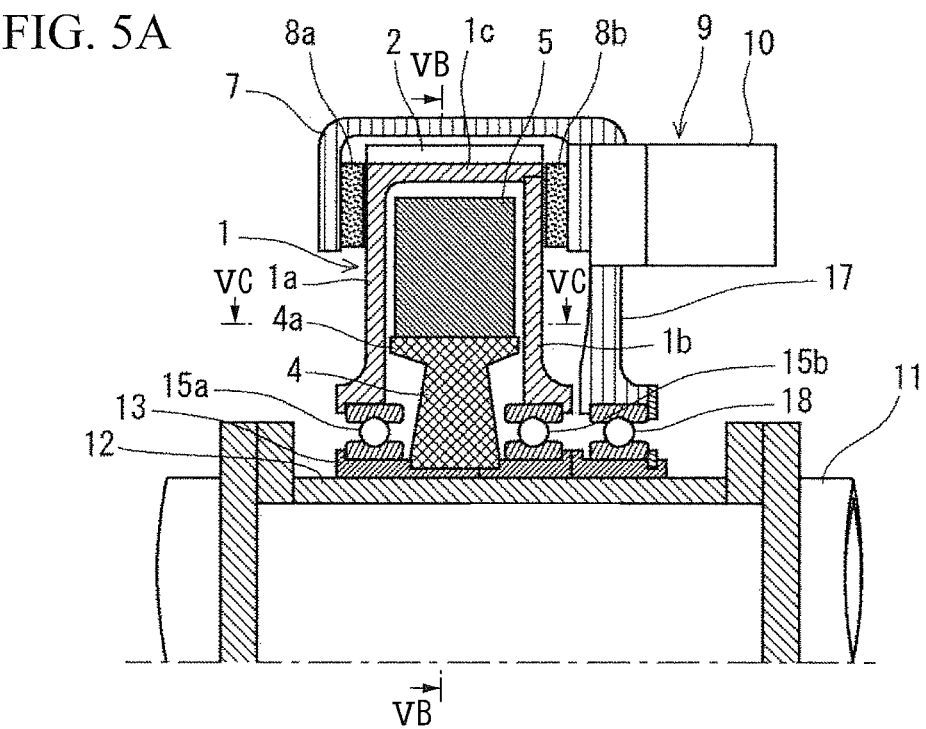
FIG. 5A is a schematic view showing the entire configuration of a synchronous-rotation-type retarding device according to a fourth embodiment of the present invention, and is a side view in which part of the device is sectionally shown.
Figure 5B:
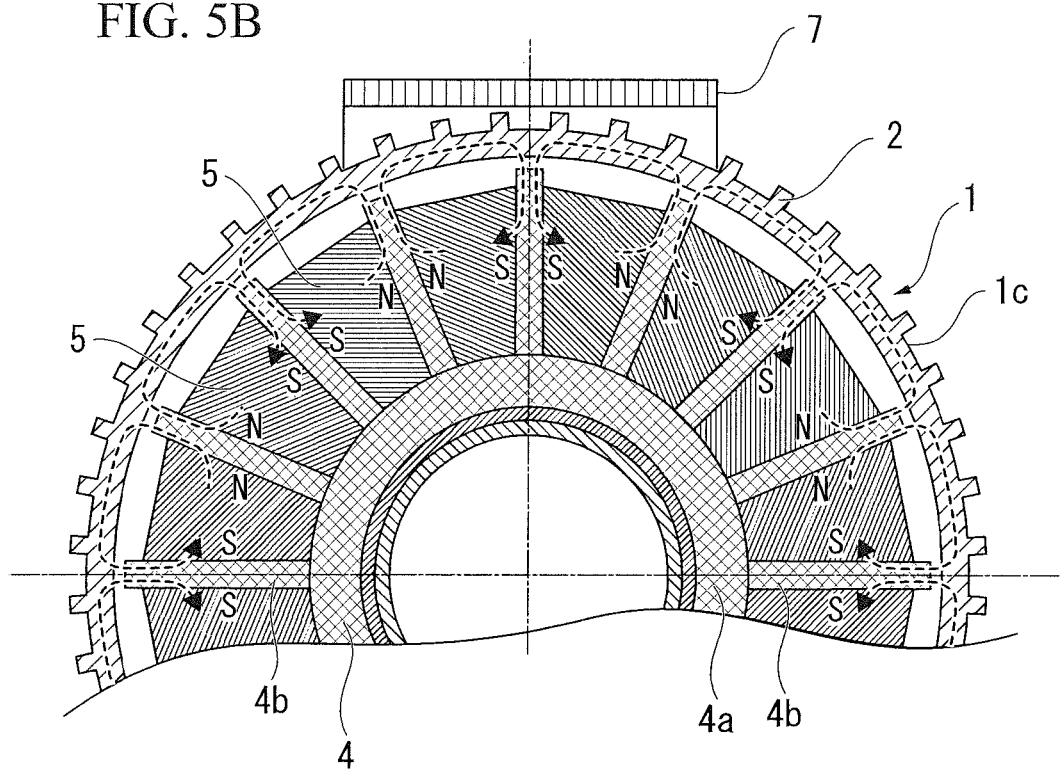
FIG. 5B is a diagram showing a schematic configuration of the synchronous-rotation-type retarding device according to the same embodiment, and is a diagram showing a cross section along VB-VB in FIG. 5A.
Figure 5C:
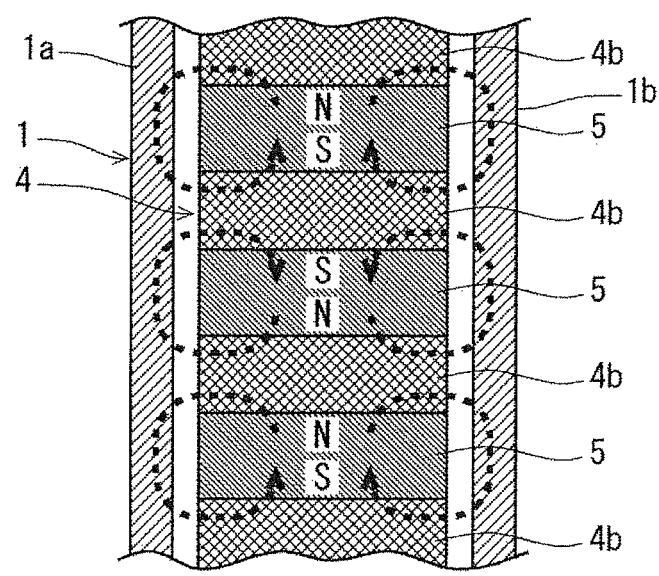
FIG. 5C is a diagram showing a schematic configuration of the synchronous-rotation-type retarding device according to the same embodiment, and is a diagram showing a cross section along VC-VC in FIG. 5A.

FIG. 5A to FIG. 5C are schematic views each showing the entire configuration of a retarding device with a synchronous rotation type, which is a fourth embodiment according to the present invention. FIG. 5A is a side view in which part of the device is sectionally shown, FIG. 5B shows a cross section along VB-VB in FIG. 5A, and FIG. 5C is an exploded view showing a cross section along VC-VC in FIG. 5A. The retarding device according to the fourth embodiment shown in each of FIG. 5A to FIG. 5C is an example obtained by modifying the configuration of each of the retarding devices according to the first to the third embodiments.

As in the third embodiment, the retarding device according to the fourth embodiment has the cylinder portion 1c of the brake member 1 formed longer in the axial direction thereof than that in the first embodiment. The magnet holding member 4 includes a magnet holding ring 4a having a diameter smaller than that in the third embodiment and made out of a non-magnetic material, and on the outer peripheral surface of this magnet holding ring 4a, a plurality of permanent magnets 5 are arrange along the circumferential direction. Furthermore, ferromagnetic members 4b made out of a magnetic material are disposed between adjacent permanent magnets 5. These plurality of ferromagnetic members 4b face the inner surfaces of the paired disk portions 1a and 1b and the inner peripheral surface of the cylinder portion 1c of the brake member 1. Note that magnetic poles (north pole and south pole) of the permanent magnets 5 are directed to the thickness direction of each of the permanent magnets 5, and different magnetic poles are alternately arranged in the circumferential direction of the magnet holding member 4 (see FIG. 5B and FIG. 5C). Furthermore, the ferromagnetic member 4b is made out of a magnetic material while the magnet holding ring 4a is made out of a non-magnetic material, and hence, these are magnetically insulated from each other.

Furthermore, in the fourth embodiment, as shown in FIG. 5B and FIG. 5C, the ferromagnetic member 4b is disposed between the permanent magnets 5 adjacent in the circumferential direction, and this ferromagnetic member 4b is also held by the magnet holding ring 4a. In FIG. 5C, the flows of magnetic flux between the permanent magnet 5 and the paired disk portions 1a and 1b are indicated with arrows with dotted lines.

With the retarding device according to the fourth embodiment having the configuration as described above, during non-braking periods, the magnet holding member 4 rotates integrally with the rotating shaft 11, and the disk portions 1a and 1b and the cylinder portion 1c, each of which constitutes the brake member 1, rotates synchronously with the magnet holding member 4 due to the magnetic attraction effect of the permanent magnets 5 held by the magnet holding member 4 (magnet holding ring 4a). Thus, no difference occurs in relative rotational speed between the brake member 1 and the permanent magnets 5 arranged on the magnet holding ring 4a, and hence, braking force does not occur.

On the other hand, if the friction brake is activated at the time of braking to bring the brake member 1 to a stop, the magnet holding member 4 keeps rotating, and hence, there occurs a difference in relative rotational speed between the permanent magnets 5 arranged on the magnet holding member 4 and the disk portions 1a and 1b and the cylinder portion 1c (brake member 1). This causes eddy current to be generated on the inner surface of each of the disk portions 1a and 1b and the inner peripheral surface of the cylinder portion 1c. Then, braking force in a direction opposite to the rotational direction of the magnet holding member 4 rotating takes place due to the interaction between the eddy current generated on the inner surface of each of the disk portions 1a and 1b of the brake member 1 and the inner peripheral surface of the cylinder portion 1c and magnetic flux density from the permanent magnets 5, whereby it is possible to reduce the speed of rotation of the rotating shaft 11 through the magnet holding member 4.

Therefore, with the retarding device according to the fourth embodiment, it is possible to obtain a similar effect to that obtained in the first embodiment.

Furthermore, in the fourth embodiment, eddy current occurs on the inner surface of each of the disk portions 1a and 1b and the inner peripheral surface of the cylinder portion 1c of the brake member 1. Thus, the braking force acts from three surfaces: the inner surfaces of the disk portions 1a and 1b and the inner peripheral surface of the cylinder portion 1c, whereby it is possible to further improve the braking efficiency. Furthermore, the magnet cover 120, which is provided in the conventional retarding device shown in FIG. 1, is not necessary. Thus, by narrowing the space between the permanent magnets 5 and the disk portions 1a and 1b and the cylinder portion 1c of the brake member 1, it is possible to further improve the braking efficiency.

Fifth Embodiment

Figure 6A:
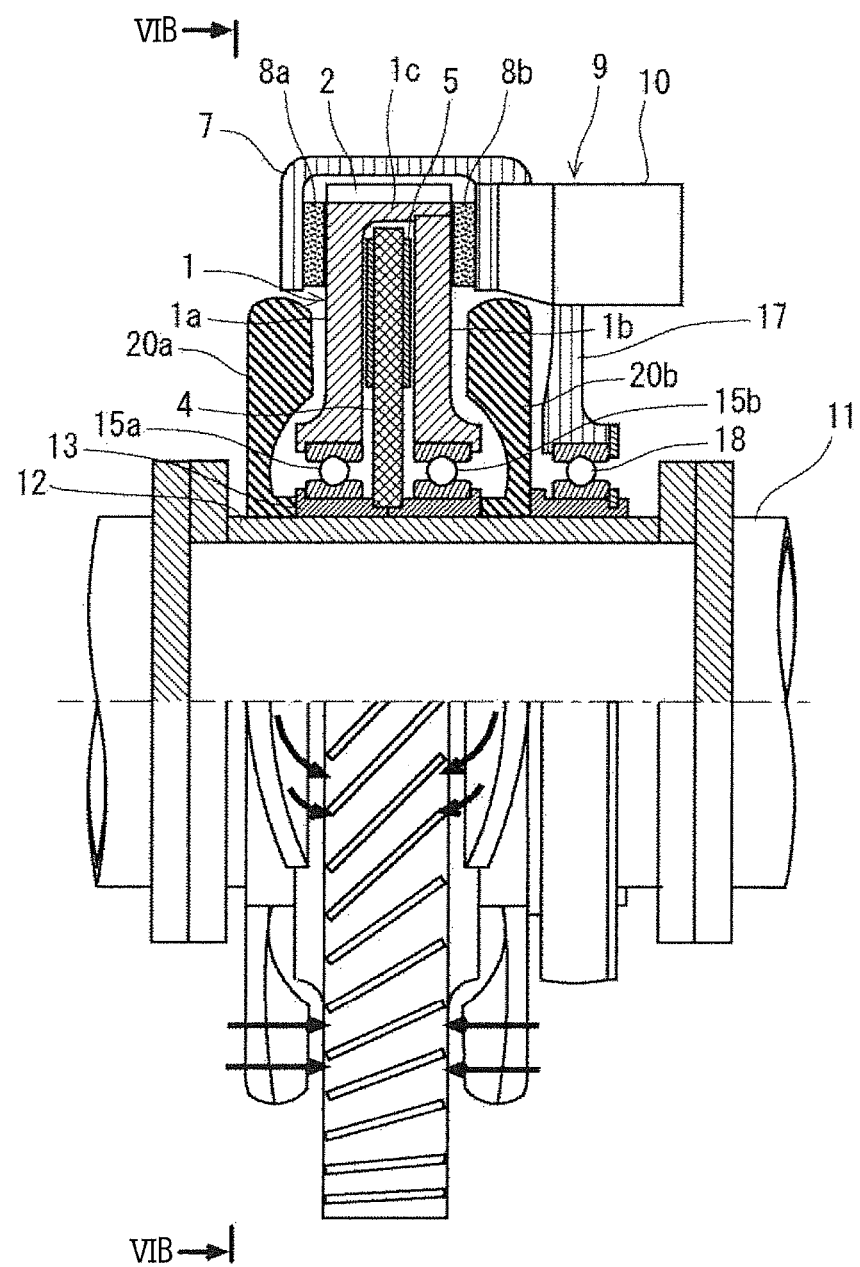
FIG. 6A is a schematic view showing the entire configuration of a synchronous-rotation-type retarding device according to a fifth embodiment of the present invention, and is a side view in which part of the device is sectionally shown.
Figure 6B:
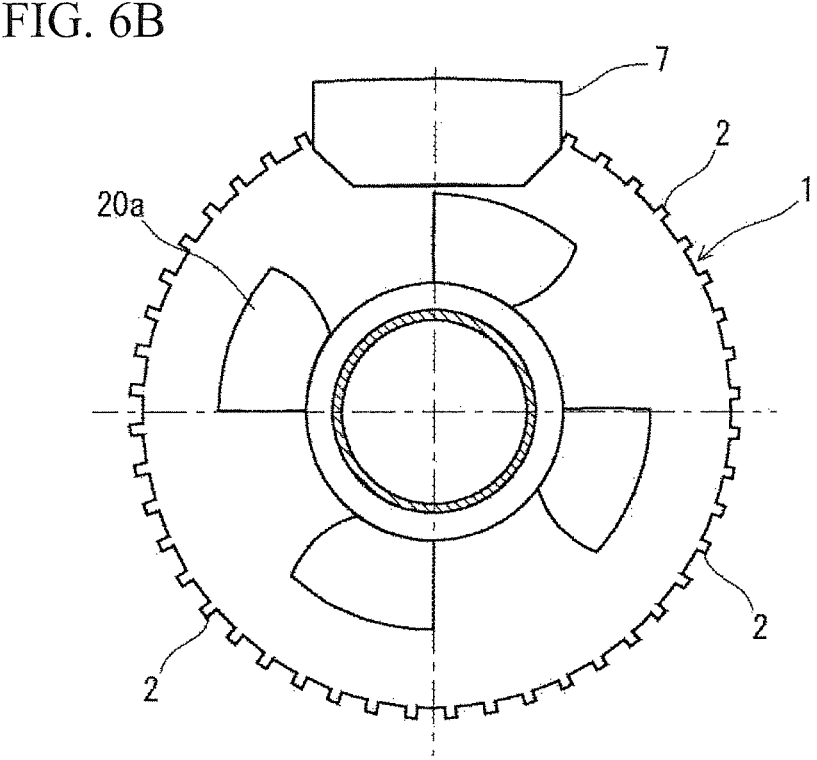
FIG. 6B is a diagram showing a schematic configuration of the synchronous-rotation-type retarding device according to the same embodiment, and is a diagram showing a cross section along VIB-VIB in FIG. 6A.

FIG. 6A and FIG. 6B are schematic views each showing the entire configuration of a retarding device with a synchronous rotation type according to a fifth embodiment of the present invention. FIG. 6A is a side view in which part of the device is schematically shown, and FIG. 6B is a diagram showing a cross section along VIB-VIB in FIG. 6A. The retarding device according to the fifth embodiment shown in FIG. 6A and FIG. 6B is obtained by modifying the configuration of the retarding device according to the first embodiment described above.

At the time of actual braking, the brake member 1 is heated due to thermal energy converted from the kinetic energy of the rotating shaft 11 in association with eddy current generated on the brake member 1, and thermal energy generated from slide of the brake member 1 on the friction member of the friction brake. At this time, within the brake member 1, the magnet holding member 4 holding the permanent magnets 5 is accommodated. Thus, the heat generated in the brake member 1 accumulates in the brake member 1, and the brake member 1 has high temperatures. With the increase in temperatures of the brake member 1, temperatures of the permanent magnets 5 increase due to radiant heat from the brake member 1, possibly reducing magnetic force of the permanent magnets 5. Furthermore, the brake member 1 may suffer permanent deformation resulting from overheating exceeding the upper allowable limited temperature, and may be affected by repetitive overheating.

In order to suppress the thermal-induced demagnetization of the permanent magnets 5 resulting from overheating of the brake member 1 as described above or the effect of overheating of the brake member 1, heat generated from the brake member 1 is configured to be radiated from the radiating fins 2. However, the brake member 1 is not moving at the time of braking, and hence, the cooling function of the radiating fins 2 works less effectively than during non-braking periods when the brake member 1 rotates synchronously with the magnet holding member 4. Thus, it is desirable to contrive to suppress the increase in temperatures of the brake member 1.

The retarding device according to the fifth embodiment has been obtained by focusing on the point described above. More specifically, as shown in FIG. 6A and FIG. 6B, the retarding device according to the fifth embodiment includes impellers 20a and 20b disposed next to the external surface of each of the paired disk portions 1a and 1b constituting the brake member 1. Each of the impellers 20a and 20b is press fitted and fixed to the connecting shaft 12 integrated with the rotating shaft 11.

With the retarding device according to the fifth embodiment having the configuration as described above, even if the rotational speed of the rotating shaft 11 reduces at the time of braking, the impellers 20a and 20b rotate if the rotating shaft 11 rotates. Thus, it is possible to blow air from the impellers 20a and 20b toward the brake member 1 that is at rest (see the arrows with a solid line in FIG. 6A). This makes it possible to forcibly cool the brake member 1, and prevent the temperatures of the brake member 1 from rising.

It should be noted that the impellers 20a and 20b as described above are, applicable not only to the retarding device according to the first embodiment but also to the retarding devices according to the second to the fourth embodiments.

Sixth Embodiment

Figure 7:
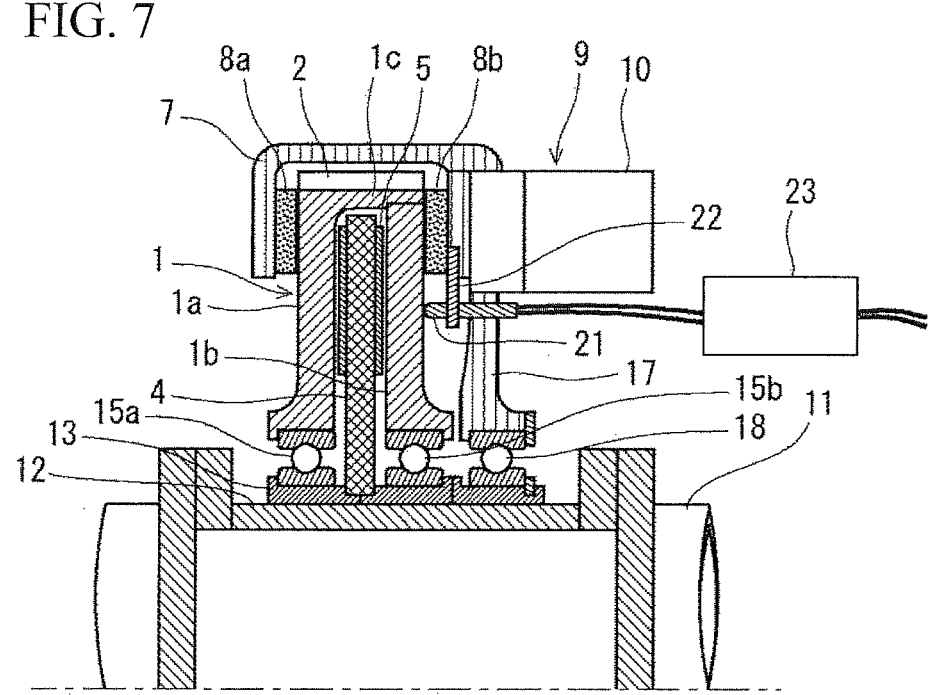
FIG. 7 is a schematic view showing the entire configuration of a synchronous-rotation-type retarding device according to a sixth embodiment of the present invention.

FIG. 7 is a schematic view showing the entire configuration of a retarding device with a synchronous rotation type according to a sixth embodiment of the present invention. FIG. 7 is a side view in which part of the device is sectionally shown. The retarding device according to the sixth embodiment shown in FIG. 7 is obtained by focusing on suppressing the increase in temperatures of the brake member 1 as in the fifth embodiment, and is obtained by modifying the configuration of the retarding device according to the first embodiment.

More specifically, as shown in FIG. 7, the retarding device according to the sixth embodiment includes a sheathed temperature sensor 21. This temperature sensor 21 is fixed to a temperature sensor holder 22 that moves in association with either one of the brake pads 8a and 8b paired at the front and the rear and serving as the friction member of the friction brake, for example, in association with the brake pad 8b on the rear side. Here, the temperature sensor 21 is connected with the temperature sensor holder 22, and at the time of braking, the top end of the sheath of the temperature sensor 21 is brought into contact with the external surface of the disk portion 1b in association with movement of the brake pad 8b on the rear side toward the disk portion 1b on the rear side. Furthermore, the temperature sensor 21 is connected with an actuator controlling unit 23 that controls actuation of the actuator 9 of the friction brake.

With the retarding device according to the sixth embodiment having the configuration as described above, during braking periods, the top end of the sheath of the temperature sensor 21 is brought into contact with the disk portion 1b (brake member 1) on the rear side, and continuously detects temperatures of the disk portion 1b. At this time, the actuator controlling unit 23 monitors temperatures of the disk portion 1b detected by the temperature sensor 21, and stops actuating the actuator 9 if the temperature exceeds a predetermined temperature. Once the actuation of the actuator 9 is stopped, the brake pads 8a and 8b and the temperature sensor 21 move away from the disk portion 1b, and are switched into a non-braking state. As a result, the brake member 1 rotates together with the rotating shaft 11, and the brake member 1 is cooled with the radiating fin 2. Thus, the actuator controlling unit 23 actuates the actuator 9 again after a predetermined period of time elapses after actuation of the actuator 9 is stopped, and then, brakes the brake member 1. With the operations described above, it is possible to suppress the increase in temperatures of the brake member 1.

The predetermined temperature for the actuator 9 to stop activating and the predetermined period of time for the actuator 9 to restart actuating are set as appropriate according to materials or shapes or dimensions of the brake member 1, the magnet holding member 4, and the permanent magnet 5, and are set in advance in the actuator controlling unit 23. For example, the predetermined temperature is set in the range of approximately 300 to 400° C., and the predetermined period of time is set in the range of approximately 5 to 10 seconds.

It should be noted that the temperature sensor 21 as described above may be configured to move integrally with the brake pad 8a on the front side. Furthermore, the temperature sensor 21 is applicable not only to the retarding device according to the first embodiment but also to the retarding devices according to the second to the fifth embodiments.

Seventh Embodiment

Figure 8:
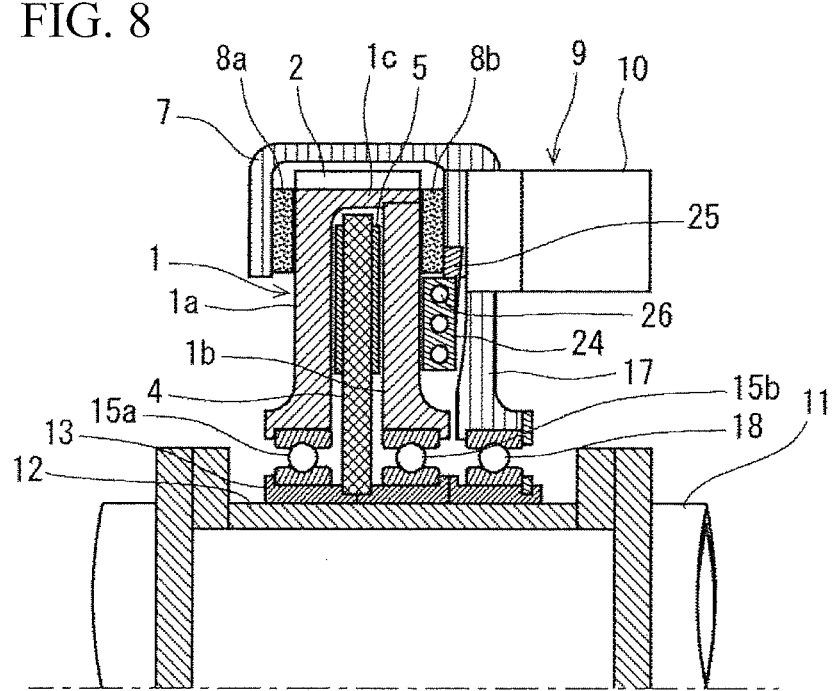
FIG. 8 is a schematic view showing the entire configuration of a synchronous-rotation-type retarding device according to a seventh embodiment of the present invention.

FIG. 8 is a schematic view showing the entire configuration of a retarding device with a synchronous rotation type according to a seventh embodiment of the present invention. FIG. 8 is a side view in which part of the device is sectionally shown. As in the fifth embodiment, the retarding device according to the seventh embodiment shown in FIG. 8 is obtained by focusing on suppressing an increase in temperatures of the brake member 1, and by modifying the configuration of the retarding device according to the first embodiment.

More specifically, as shown in FIG. 8, the retarding device according to the seventh embodiment includes a water cooling body (cooling member) 24. This water cooling body 24 is connected with a water-cooling-body holder 25 that moves integrally with either one of the brake pads 8a and 8b paired on the front and the rear serving as the friction member of the friction brake, for example, moves integrally with the brake pad 8b on the rear side. Furthermore, at the time of braking, the water cooling body 24 is brought into contact with the external surface of the disk portion 1b in association with movement of the brake pad 8b on the bask side toward the disk portion 1b on the rear side of the brake member 1.

Furthermore, a water passage 26 is formed within the water cooling body 24, and has an inlet port and an outlet port each connected with pipes, not shown. These pipes are connected with a water cooling system (for example, a radiator) of the vehicle, and cooling water circulates through the water passage 26 within the water cooling body 24, whereby low temperatures are maintained at all times.

With the retarding device according to the seventh embodiment having the configuration as described above, at the time of braking, the water cooling body 24 is brought into contact with the disk portion 1b (brake member 1) on the rear side. Thus, the disk portion 1b is forcibly cooled through heat exchange with the water cooling body 24. As described above, it is possible to prevent the increase in temperatures of the brake member 1.

It should be noted that the water cooling body 24 as described above may be configured to move integrally with the brake pad 8a on the front side. Furthermore, the water cooling body 24 is applicable not only to the retarding device according to the first embodiment but also to the retarding devices according to the second to the sixth embodiments. Note that, instead of the water cooling body 24, a cooling member in which cooling oil and the like flows may be used.

Eighth Embodiment

Figure 9:
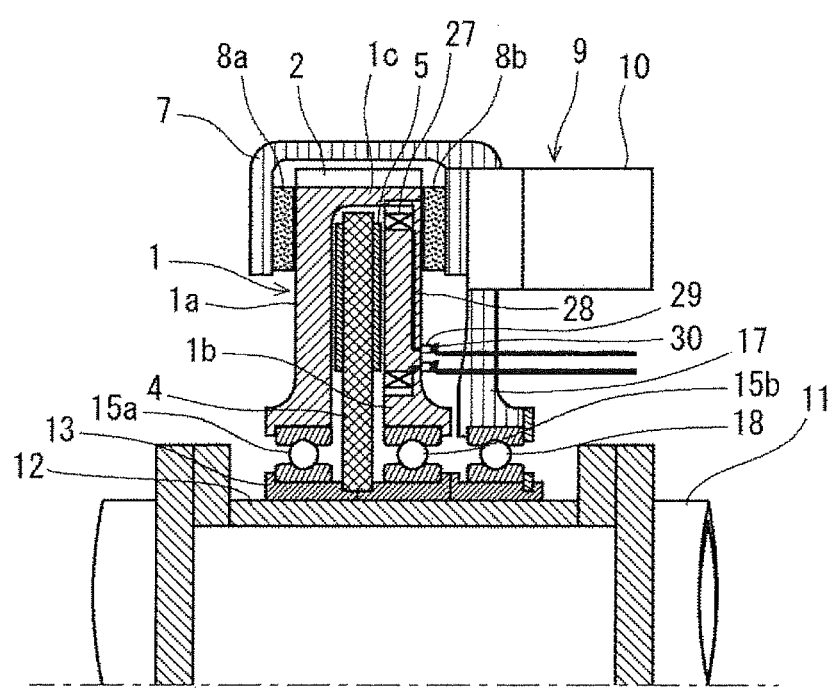
FIG. 9 is a schematic view showing the entire configuration of a synchronous-rotation-type retarding device according to an eighth embodiment of the present invention.

FIG. 9 is a schematic view showing the entire configuration of a retarding device with a synchronous rotation type according to an eighth embodiment of the present invention. FIG. 9 is a side view in which part of the device is schematically shown. The retarding device according to the eighth embodiment shown in FIG. 9 is obtained by modifying the configuration of the retarding device according to the first embodiment.

In order to obtain the braking force, retarding devices employ a basic principle in which kinetic energy of the rotating shaft 11 is converted into thermal energy. However, by adding an electric energy recovery function of converting part of the kinetic energy into electric energy and collecting this energy, it is possible to improve energy efficiency, and this is expected to expand the device's applications. This is because, in general, vehicles equipped with the retarding device have various types of electrical components that require electric power, and in recent years, hybrid electric vehicles or electric vehicles, in which part or all of driving power for propulsion is supplied from electrically driven motors, have been attracting attention.

The retarding device according to the eighth embodiment is obtained by focusing on this point. More specifically, as shown in FIG. 9, the retarding device according to the eighth embodiment has the following configuration to achieve the electric energy recovery function. The disk portion 1b on the rear side of the paired disk portions 1a and 1b constituting the brake member 1 has an inner surface facing the permanent magnets 5, and in this inner surface, plural wire-wound coils 27 are embedded in the circumference direction thereof. More specifically, an area of this inner surface of the disk portion 1b facing the permanent magnets 5 is divided into plural sections in the circumferential direction, and the wire-wound coils 27 are each mounted along a groove forming the outline of each of the divided sections. Each of the wire-wound coils 27 is formed by winding, plural times, an electrically conductive wire having high electrical conductivity such as a copper wire.

An electrically conductive wire 28 of each of the wire-wound coils 27 is led out and is exposed from the external surface side of the disk portion 1b on the rear side, and is connected with a terminal 29 disposed on the external surface of this disk portion 1b. The wire-wound coils 27 and the terminal 29 described above rotate integrally with the disk portion 1b (brake member 1) together with the rotating shaft 11. The terminal 29 is brought into contact with an electric contact point 30 such as a brush in a slidable manner. This electric contact point 30 is fixed to a non-rotating portion of the vehicle, and is connected with a battery provided on the vehicle through a controlling circuit.

With the retarding device according to the eighth embodiment having the configuration as described above, during non-braking periods, the brake member 1 rotates synchronously with the magnet holding member 4 in association with rotation of the magnet holding member 4 integrally with the rotating shaft 11. In this case, there occurs no difference in relative rotational speed between the permanent magnets 5 of the magnet holding member 4 and the disk portions 1a and 1b (brake member 1). Thus, no change occurs in a magnetic field from the permanent magnets 5 acting on the inner surface of the disk portion 1a on the front side and a magnetic field from the permanent magnets 5 acting on the inner surface of the disk portion 1b on the rear side and the wire-wound coils 27. Therefore, during non-braking periods, eddy current does not occur on the inner surface (eddy-current generating portion) of each of the disk portions 1a and 1b, and induced electromotive force does not occur in the wire-wound coils 27, which means that the braking force and the electric power do not occur.

On the other hand, if the friction brake is activated to bring the brake member 1 to a stop at the time of braking, the magnet holding member 4 keeps rotating, and hence, there occurs a difference in relative rotational speed between the permanent magnets 5 disposed on the magnet holding member 4 and the disk portions 1a and 1b (brake member 1). This causes a change in both the magnetic field from the permanent magnets 5 acting on the inner surface of the disk portion 1a on the front side and the magnetic field from the permanent magnets 5 acting on the inner surface of the disk portion 1b on the rear side and the wire-wound coils 27. On the disk portion 1a on the front side, the magnetic field from the permanent magnets 5 changes, whereby eddy current occurs on the inner surface thereof. On the other hand, on the disk portion 1b on the rear side, the magnetic field from the permanent magnets 5 changes, whereby eddy current occurs on the inner surface thereof, and furthermore, the induced electromotive force occurs on the wire-wound coils 27 through electromagnetic induction. At this time, in association with rotation of the magnet holding member 4, a state where the magnetic field (magnetic flux) from the permanent magnets 5 penetrates the wire-wound coils 27 and a state where this magnetic field does not penetrate the wire-wound coils 27 alternately appear, and hence, the eddy current and the induced electromotive force alternately take place repeatedly.

Then, braking force in a direction opposite to the rotational direction takes place on the magnet holding member 4 due to the interaction between the eddy current occurring on the inner surface of each of the disk portions 1a and 1b of the brake member 1 and magnetic flux density from the permanent magnets 5, whereby it is possible to reduce the speed of rotation of the rotating shaft 11 through the magnet holding member 4. Furthermore, the induced electromotive force occurring on the wire-wound coils 27 is recovered through the electrically conductive wire 28, the terminal 29, and the electric contact point 30 from the wire-wound coils 27, and can be collected in a battery as electric power.

It should be noted that the wire-wound coils 27 as described above may be configured to be embedded in the disk portion 1a on the front side, or may be configured to be embedded in both of the disk portions 1a and 1b. Furthermore, the wire-wound coils 27 are applicable not only to the retarding device according to the first embodiment but also to the retarding devices according to the second to the seventh embodiments. In particular, in the case where the wire-wound coils 27 are applied to the retarding devices according to the third embodiment and the fourth embodiment, the wire-wound coils 27 may be embedded in the inner peripheral surface of the cylinder portion 1c.

It should be noted that the present invention is not limited to each of the embodiments described above, and various modifications thereto are possible without departing from the scope of the present invention.

For example, in each of the embodiments described above, descriptions have been made of the case where the disk portions 1a and 1b and the cylinder portion 1c constituting the brake member 1 are made out of an electrically conductive material to make the brake member 1 serve as an eddy-current generating member. However, it may be possible to provide the eddy-current generating portion made out of an electrically conductive material on the inner surface of the disk portions 1a and 1b or the inner peripheral surface of the cylinder portion 1c.

Furthermore, it may be possible to optionally set a combination of locations where the eddy-current generating portion is formed, from among the inner surfaces of the disk portions 1a and 1b and the inner peripheral surface of the cylinder portion 1c.

Furthermore, in each of the embodiments described above, descriptions have been made of the case where the brake member 1 includes the disk portions 1a and 1b and the cylinder portion 1c, and surrounds the magnet holding member 4 from the outside. However, for example, it may be possible to form a portion that opens to the outside, on a portion of the connecting portion or the disk portion.

Furthermore, it may be possible to employ a configuration in which thermal treatment or surface treatment is applied to the outer periphery portion of the external surface of the disk portion (brake member) against which the friction member is pressed at the time of braking in order to increase the surface hardness thereof, or a steel sheet having excellent wear resistance is attached on this outer periphery portion, thereby reducing the amount of wear. In the case where the brake member is made out of aluminum alloy, it may be possible to form anodic oxide coating on the surface thereof in order to improve the wear resistance.

Furthermore, it is optional as to whether to provide the impellers 20a and 20b connected to the rotating shaft 11, the actuator 9 that moves the paired brake pads 8a and 8b toward the disk portions 1a and 1b, the actuator controlling unit (not shown) that stop actuating the actuator 9 in the case where temperatures of the disk portions 1a and 1b exceed a predetermined temperature, and the cooling member (for example, the water cooling body 24) that is brought into contact with the external surface of each of the disk portions 1a and 1b.

Furthermore, as for the friction brake that brings the brake member to a stop at the time of braking, it may be possible to use not only a friction brake that uses the electrically driven direct-acting actuator as a driving source and presses the brake pads against the external surface of the brake member (disk portion) but also a friction brake that employs an electromagnetic clutch mechanism with electromagnets and presses a clutch plate serving as the friction member against the external surface of the brake member, or a configuration that employs a drum brake mechanism and presses brake shoes serving as the friction member against the outer peripheral surface of the brake member (cylinder portion).

INDUSTRIAL APPLICABILITY

According to the present invention, it is possible to provide the eddy-current retarding device having the reduced size in the axial direction to be miniaturized, whereby the present invention has high industrial applicability.

BRIEF DESCRIPTION OF THE REFERENCE SYMBOLS

1: brake member
1a, 1b: disk portion (eddy-current generating member)
1c: cylinder portion (eddy-current generating member)
2: radiating fin
4: magnet holding member
4a: magnet holding ring
4b: ferromagnetic member
5: permanent magnet
7: brake caliper
8a, 8b: brake pad
9: electrically driven direct-acting actuator
10: electrically driven motor
11: rotating shaft
12: connecting shaft
13: sleeve
15a, 15b: bearing
17: bracket
18: bearing
20a, 20b: impeller
21: temperature sensor
22: temperature sensor holder
23: actuator controlling unit
24: water cooling body (cooling member)
25: water-cooling-body holder
26: water passage
27: wire-wound coil
28: electrically conductive wire
29: terminal
30: electric contact point
106: brake disk
120: magnet cover

The invention claimed is:

1. An eddy-current retarding device, comprising:
a magnet holding member that is coaxially provided to a rotating shaft and holds a plurality of permanent magnets in a circumferential direction;
a brake member including:
paired disk portions disposed on both sides of the magnet holding member in an axial direction of the rotating shaft;
a connecting portion that connects the paired disk portions to each other; and
an eddy-current generating portion that causes eddy current due to rotation of the permanent magnets, the brake member being supported in a relatively rotatable manner with respect to the rotating shaft; and
a friction brake that presses against the paired disk portions of the brake member at a time of braking to bring the brake member to a stop.

2. The eddy-current retarding device according to claim 1, wherein
the brake member covers an area around the magnet holding member.

3. The eddy-current retarding device according to claim 1, wherein
the plurality of permanent magnets are arranged in a manner such that different magnetic poles are alternately arranged in a circumferential direction on a surface of the magnet holding member perpendicular to the rotating shaft, and are disposed so as to face the eddy-current generating portion formed on an inner surface of at least one of the paired disk portions.

4. The eddy-current retarding device according to claim 3, wherein
the plurality of permanent magnets are disposed in a plurality of through-holes formed in a circumferential direction of the magnet holding member so as to penetrate the magnet holding member in the axial direction of the rotating shaft, and
each of the poles faces the eddy-current generating portion formed on an inner surface of each of the paired disk portions.

5. The eddy-current retarding device according to claim 1, wherein
the connecting portion is a cylindrical member that connects the paired disk portions on an outer periphery, and has an inner peripheral surface having the eddy-current generating portion formed thereon, and
the plurality of permanent magnets are arranged in a radial direction of the magnet holding member in a manner such that different magnetic poles are alternately arranged circumferentially on an outer periphery side of the magnet holding member, and face the eddy-current generating portion.

6. The eddy-current retarding device according to claim 1, wherein
the connecting portion is a cylinder portion that connects the paired disk portions on an outer periphery, and the eddy-current generating portion is formed on an inner surface of at least one of the paired disk portions and an inner peripheral surface of the cylinder portion;
the plurality of permanent magnets are arranged on an outer periphery of the magnet holding member in a manner such that magnetic poles are alternately arranged in a circumferential direction; and
a ferromagnetic member is disposed between the plurality of permanent magnets, and the ferromagnetic member faces the eddy-current generating portion.

7. The eddy-current retarding device according to claim 1, further comprising:
an impeller disposed next to an external surface of each of the paired disk portions and connected to the rotating shaft.

8. The eddy-current retarding device according to claim 1, wherein
the friction brake includes:
a brake caliper that is fixed to a non-rotating portion of a vehicle provided with the rotating shaft, and has paired brake pads that serve as the friction member to squeeze the paired disk portions; and an actuator that actuates the brake caliper, and moves the paired brake pads toward the disk portions.

9. The eddy-current retarding device according to claim 8, further comprising:

a temperature sensor that is brought into contact with an external surface of each of the disk portions in association with movement of the brake pads toward the disk portions, and detects a temperature of the disk portions; and an actuator controlling unit that stops actuating the actuator in a case where the temperature of the disk portions detected by the temperature sensor exceeds a predetermined temperature.

10. The eddy-current retarding device according to claim 8, further comprising:

a cooling member that is brought into contact with an external surface of each of the disk portions in association with movement of the brake pads toward the disk portions.

11. The eddy-current retarding device according to claim 1, wherein the brake member includes a section facing the permanent magnets and having a plurality of wire-wound coils embedded therein along a circumferential direction.

* * * * *